US012794288B2

(12) United States Patent
Koa et al.

(10) Patent No.: US 12,794,288 B2
(45) Date of Patent: Nov. 10, 2026

(54) ROTOR ASSEMBLY

(71) Applicant: Rolls-Royce Deutschland Ltd & Co KG, Blankenfelde-Mahlow (DE)

(72) Inventors: Jon Ivar Koa, Trondheim (NO); Stev Erlend Skaar, Trondheim (NO)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 268 days.

(21) Appl. No.: 18/603,391

(22) Filed: Mar. 13, 2024

(65) Prior Publication Data

US 2024/0339877 A1 Oct. 10, 2024

(30) Foreign Application Priority Data

Mar. 13, 2023 (DE) .................... 10 2023 106 172.0

(51) Int. Cl.

*H02K 1/278* (2022.01)
*H02K 1/02* (2006.01)
*H02K 1/04* (2006.01)
*H02K 7/00* (2006.01)

(52) U.S. Cl.

CPC .............. *H02K 1/278* (2013.01); *H02K 1/02* (2013.01); *H02K 1/04* (2013.01); *H02K 7/003* (2013.01)

(58) Field of Classification Search

CPC ............ H02K 1/02; H02K 1/04; H02K 1/278; H02K 7/003

See application file for complete search history.

(56) References Cited

U.S. PATENT DOCUMENTS

2009/0284093 A1* 11/2009 Shiao .................... H02K 1/278 29/598
2018/0316246 A1* 11/2018 Andonian .............. H02K 1/278
2018/0337565 A1* 11/2018 Reddy .................. H02K 17/168
2022/0209598 A1* 6/2022 Boxberg ................ H02K 1/278
2022/0209599 A1* 6/2022 Gyllensten ............... H02K 1/28
2022/0302779 A1 9/2022 Chong
2022/0329120 A1* 10/2022 Gehrke .................... H02K 1/27
2023/0018843 A1* 1/2023 Imahori ................. H02K 7/003
2023/0051422 A1* 2/2023 Ferrara .................. H02K 7/003

(Continued)

FOREIGN PATENT DOCUMENTS

CN 108390484 A * 8/2018 ............ H02K 1/278
CN 114421701 A * 4/2022 ............ H02K 7/003

(Continued)

OTHER PUBLICATIONS

German Search Report for German Application No. 10 2023 106 172.0 mailed Oct. 20, 2023.

*Primary Examiner* — Christopher M Koehler
*Assistant Examiner* — Ethan Nguyen Vo
(74) *Attorney, Agent, or Firm* — Lempia Summerfield Katz LLC

(57) ABSTRACT

A rotor assembly includes a rotating shaft having a rotation axis that defines an axial direction, permanent magnets attached to the rotating shaft, and at least one sleeve ring. The at least one sleeve ring is configured to radially retain the permanent magnets. The rotor assembly includes a sealing sleeve arranged between the permanent magnets and the at least one sleeve ring. The sealing sleeve includes a front end and a rear end, and is sealed both at a front end and at a rear end to provide for a hermetically sealed enclosure in which the permanent magnets are located.

22 Claims, 4 Drawing Sheets

(56) References Cited

U.S. PATENT DOCUMENTS

| | | | | |
|---|---|---|---|---|
| 2023/0193917 | A1* | 6/2023 | Moon | H02K 1/28<br>415/122.1 |
| 2023/0402889 | A1* | 12/2023 | Ono | H02K 1/278 |

FOREIGN PATENT DOCUMENTS

| | | | | | |
|---|---|---|---|---|---|
| DE | 10036555 | A1 | | 2/2002 | |
| DE | 112016004399 | T5 | * | 6/2018 | H02K 1/2753 |

* cited by examiner

ROTOR ASSEMBLY

This application claims the benefit of German Patent Application No. DE 10 2023 106 172.0, filed on Mar. 13, 2023, which is hereby incorporated by reference in its entirety.

BACKGROUND

The present disclosure relates to a rotor assembly.

It is generally required to radially retain permanent magnets that are attached to the rotor of an electric machine such as a permanent magnet synchronous machine. To this end, the use of metallic rotor sleeve rings arranged next to each other in an axial direction is known. The metallic rotor sleeve rings are assembled over the permanent magnets by various methods such as press-fitting, heat shrinking, or direct winding under tension to achieve an interference fit. A problem associated with known designs lies in that the permanent magnets are not suitably protected against corrosion. For example, rotor sleeve rings press-fit over permanent magnets may have axial gaps between the rotor sleeve rings, which allow air and moisture to reach the magnets.

Document US 2022/0302779 A1 discloses to arrange a metallic layer between the permanent magnets and metallic rotor sleeve rings to protect and reduce damage and/or mechanical wear to the permanent magnets in the metallic rotor sleeve rings.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a rotor assembly having permanent magnets that provide for an improved corrosion protection of the permanent magnets is provided.

Accordingly, a rotor assembly that includes a rotating shaft having a rotation axis that defines an axial direction, permanent magnets attached to the rotating shaft, and at least one sleeve ring is provided. The at least one sleeve ring is configured to radially retain the permanent magnets.

The present embodiments provide for a sealing sleeve that is arranged between the permanent magnets and the at least one sleeve ring. The sealing sleeve includes a front end and a rear end, and is sealed both at the front end and at the rear end to provide for a hermetically sealed enclosure in which the permanent magnets are located.

The present embodiments are thus based on the idea to provide for a sealing sleeve that is fit over the permanent magnets of the rotor to provide for corrosion protection of the permanent magnets. The sealing sleeve is sealed at both ends such that air and moisture are not able to reach the permanent magnets. The sealing sleeve may be a one-piece sealing sleeve including a sealing sleeve that consists of parts joined to form a single piece.

The provision of a sealing sleeve is associated with the further advantage that the sealing sleeve provides for a smooth assembly surface for the at least one sleeve ring that may be better fit over the sealing sleeve compared to fitting them directly over the permanent magnets. For example, the permanent magnets would need to be ground to receive a smooth surface and well-controlled diameter. Also, even when grinding the permanent magnets, there may still be small gaps between segmented magnets. Such problems are avoided by the sealing sleeve providing a smooth assembly surface. The sealing sleeve provides for a low surface roughness and high surface uniformity, reducing the probability of damage when assembling the at least one sleeve ring. Also, the sealing sleeve provides for a well controlled diameter that enables well controlled tightness for the interference fit.

A still further advantage of the present embodiments lies in that the sealing sleeve also provides for a debris retention, preventing that magnet particles, adhesive debris or the like, are ejected through gaps between the sleeve rings (e.g., if several sleeve rings are used), which may cause wear and damage.

The present embodiments have particular relevance for power dense applications in which the rotor requires cooling such as air cooling with inlet air from a surrounding environment that may expose the permanent magnets to moisture and contaminants in the environment. Such power dense application may be aerospace propulsion and power generation where surrounding air is a readily available cooling medium.

The permanent magnets do not need to be directly attached to the rotor shaft. In embodiments, the permanent magnets are directly attached to the rotor shaft. In other embodiments, the permanent magnets are indirectly attached to the rotor shaft. For example, the rotor may include a rotor core between the permanent magnets and the rotor shaft, where the permanent magnets are attached to the rotor core.

A “rotor sleeve” and “rotor sleeve rings” are also referred to as “rotor bandage” by the skilled person.

The at least one sleeve ring may include a plurality of sleeve rings arranged next to each other in the axial direction, where the sleeve rings are configured to radially retain the permanent magnets.

In an embodiment, the rotor assembly further includes a front axial stop and a rear axial stop attached to or being one part with the rotating shaft. The permanent magnets are attached to the rotating shaft between the front axial stop and the rear axial stop. The sealing sleeve is sealed at the front end to the front axial stop and at the rear end to the rear axial stop. Accordingly, the front axial stop and the rear axial stop provide the structure that allows to seal the sleeve at the front end and at the rear end.

The front axial stop may be a front disc, and the rear axial stop may be a rear disc, where the front disc and the rear disc extend in a radial direction from the rotating shaft.

In case the axial stops and the rotating shaft are not made of one piece, the connection of the front axial stop to the rotating shaft and the connection of the rear axial stop to the rotating shaft may also be sealed to provide the provision of a hermetically sealed environment for the permanent magnets.

In an embodiment, the front axial stop and the rear axial stop are made of the same material as the rotating shaft, or made from a solid piece, thereby preventing different thermal expansion of the axial stops and of the rotating shaft in case of a temperature change. Such different thermal expansion may threaten the sealing of the permanent magnets.

The sealing of the ends of the sealing sleeve may be implemented in a plurality of manners. In an embodiment, the sealing sleeve is welded, brazed, or soldered at the front end and at the rear end to the front axial stop and the rear axial stop, respectively. In another embodiment, the sealing sleeve is sealed by a gasket such as an O-ring at the front end and by a gasket such as an O-ring at the rear end to the front axial stop and the rear axial stop, respectively. Such gasket may be arranged in a recess at a radially outer face of the axial stop. In a still further embodiment, the sealing sleeve is connected by an adhesive joint at the front end and the rear end to the front axial stop and the rear axial stop, respectively, to provide for the sealing.

Naturally, the kind of sealing may depend on the material chosen for the sealing sleeve and the axial stops. Generally, the sealing sleeve may be made of any material with low diffusion rates to reduce corrosion of the permanent magnets and that withstands compressive forces. In an embodiment, the sealing sleeve is made of a non-metallic material. The sealing sleeve may be made of a carbon-fiber-reinforced polymer. In another embodiment, the sealing sleeve is made of stainless steel.

Also, the sealing sleeve may be made of a low permeability material having a relative permeability in the range, for example, of between 1 and 10. Such low-/non-ferromagnetic material is preferable to have a low interference with rotor-stator electromagnetic field interaction. In embodiments, the sealing sleeve is made of an austenitic stainless steel such as grade 304 or grade 316, or is made of austenitic nickel-chromium-based superalloys.

Generally, the material of the sealing sleeve is non-corrosive or of low corrosive nature. The material of the sealing sleeve may be of the same material as the shaft and/or the axial stops.

In further embodiments, the permanent magnets are neodymium iron boron magnets (NdFeB). As such magnets are more prone to corrosion than, for example, samarium-cobalt magnets (SmCo), the use of a sealing sleeve is particularly advantageous in combination with such magnets. However, the present embodiments may also be implemented with permanent magnets that are samarium-cobalt magnets.

The one or number of (e.g., several) sleeve rings may be press-fit or shrink-fit to the sealing sleeve, where press-fitting or shrink-fitting is facilitated by the sealing sleeve providing a smooth assembly surface. In a further alternative, the one or number of (e.g., several) sleeve rings are attached by hydraulic dilation to the sealing sleeve.

To even further improve the surface roughness of the outer surface of the sealing sleeve, in embodiments, the sealing sleeve has been machined or ground. This allows to better control the interference fit for the load carrying sleeve rings.

In a further embodiment, the inner surface of the sealing sleeve is in direct contact with the permanent magnets to allow the creation of a positive pressure from the load carrying sleeve rings through the sealing sleeve to the permanent magnets. For example, the sealing sleeve is press-fit or shrink-fit to the permanent magnets. In another example, the sealing sleeve is deformed by the load carrying sleeve rings to be brought in contact with the magnets.

In an embodiment, the permanent magnets are segmented in the axial direction or in other directions (e.g., radial, tangential). The permanent magnets may be arranged in a plurality of magnet configurations. In one embodiment, the permanent magnets are arranged in a Halbach array configuration.

In a further embodiment, the thickness of the sealing sleeve is smaller than the thickness of the at least one sleeve ring. Generally, the sealing sleeve may be thin, similar to a liner. In embodiments, the thickness of the sealing sleeve is less than 50 percent, less than 20 percent, or less than 10 percent of the thickness of the sleeve ring.

The rotor assembly of the present embodiments may be the rotor assembly of a permanent magnet synchronous machine.

In a further aspect, the present embodiments provide for a rotor assembly that includes a rotating shaft having a rotation axis that defines an axial direction and permanent magnets attached to the rotating shaft. A sleeve ring is provided, where the sleeve ring is configured to radially retain the permanent magnets, and where the sleeve ring includes a front end and a rear end and is sealed both at the front end and at the rear end to provide for a hermetically sealed enclosure in which the permanent magnets are located.

This aspect of the present embodiments is based on the idea to provide for a sealing of the permanent magnets by a sleeve ring, where the sleeve ring is both configured to radially retain the permanent magnets and to be sealed at the front end and at the rear end to provide for a hermetically sealed enclosure in which the permanent magnets are located. Accordingly, compared to the first aspect of the present embodiments, a separate sealing sleeve is avoided, and, instead, the sleeve ring itself also provides for the function of sealing the permanent magnets. The sleeve ring may be a one-piece sleeve ring including a sleeve ring that consists of parts joined to form a single piece.

In an embodiment, the rotor assembly further includes a front axial stop and a rear axial stop attached to or being one part with the rotating shaft, where permanent magnets are attached to the rotating shaft between the front axial stop and the rear axial stop, and where the sleeve ring is sealed at the front end to the front axial stop and at the rear end to the rear axial stop. Accordingly, the front axial stop and the rear axial stop provide the structure that allows to seal the sleeve ring at the front end and at the rear end.

The sealing of the ends of the sleeve ring may be implemented in a plurality of manners. In an embodiment, the sleeve ring is welded, brazed, or soldered at the front end and at the rear end to the front axial stop and the rear axial stop, respectively, to achieve the sealing. In another embodiment, the sleeve ring is sealed by a gasket at the front end and by a gasket at the rear end to the front axial stop and the rear axial stop, respectively. Such gasket may be arranged in a recess at a radially outer face of the axial stop. The gasket may be an O-ring. In a still further embodiment, the sleeve ring is connected by an adhesive joint at the front end and the rear end to the front axial stop and the rear axial stop, respectively, to provide for a sealing.

In an embodiment, the sleeve ring is attached to the permanent magnets by interference fit. To improve the interference fit control for the press fitted sleeve ring, a well-controlled outer diameter of the magnets may be provided for. Such well-controlled outer diameter may be provided for by grinding the outer surface after assembly of the permanent magnets is completed. Such grinding also creates a better surface for press-fitting of the sleeve as previously described.

Further, the outer diameters of the axial stops may also be ground, in the same or a separate operation as the permanent magnets, to give the axial stops the same diameter and surface conditions.

The sleeve ring may be formed by metallic bands or composite materials such as carbon-fiber-reinforced polymers. The sleeve ring generally consists of a material that is suitable for carrying high loads and, accordingly, may have a high strength and high stiffness. Further, the sleeve ring may consist of a material that has a low interference with a stator-rotor electromagnetic field interaction. Accordingly, a low permeability, as discussed above, may be provided. Further, the sleeve ring may consist of a material effectively sealing the permanent magnets from the environment, thereby providing for low leakage and diffusion from the environment into the magnets.

Further embodiments of the second aspect of the present embodiments (e.g., without a sealing sleeve) correspond to the respective embodiments of the first aspect of the present embodiments (e.g., with sealing sleeve), such that reference is made in this respect to the description of the first aspect.

DETAILED DESCRIPTION

Figure 1:
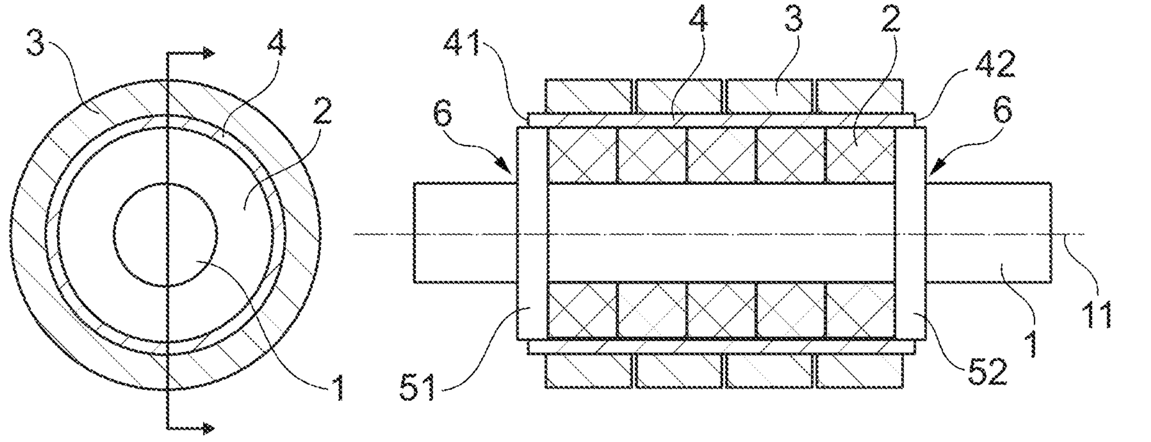
FIG. 1 is a schematic depiction of an embodiment of a rotor assembly.

FIG. 1 shows schematically a rotor assembly of an electrical machine. In embodiments, the rotor assembly is the rotor assembly of a permanent magnet synchronous machine.

The rotor assembly includes a rotating shaft 1 that has a rotation axis 11 about which the rotating shaft 1 rotates and which defines an axial direction of the rotor assembly. The rotor assembly further includes permanent magnets 2 that are attached to the rotating shaft 1 (e.g., either directly as shown or through a magnet core located between the rotating shaft 1 and the permanent magnets 2 (not shown)). The permanent magnets 2 may be segmented in the axial direction, as shown in FIG. 1. For example, the permanent magnets 2 may be formed by a plurality of disk-shaped, segmented magnets that are arranged on an outer surface of the rotating shaft 1, one behind the other in the axial direction.

The permanent magnets 2 may be glued or otherwise connected to the rotating shaft 1. The sequence of magnetic polarity of the permanent magnets 2 in a circumferential direction is provided in a manner known to the skilled person. For example, the permanent magnets 2 are arranged in a Halbach configuration.

Also attached to the rotating shaft 1 are two axial stops in the form of discs 51, 52. The permanent magnets 2 extend in an axial direction between the front axial stop 51 and the rear axial stop 52. The axial stops 51, 52 are axial stops for the permanent magnets 2 and prevent the permanent magnets 2 from becoming free or loose in the axial direction.

The rotating shaft 1 consists, for example, of iron or stainless steel, or a non-conductive material. The rotating shaft 1 may be formed in one piece. The axial stops 51, 52 may consist of a same material as the rotating shaft 1. The axial stops 51, 52 may be separate elements or be formed in one piece with the rotating shaft 1.

The rotor assembly further includes a plurality of sleeve rings 3 that are configured and serve to radially retain the permanent magnets 2. The sleeve rings 3 are formed as a plurality of individual rings arranged next to each other in the axial direction. The sleeve rings 3 represent elements of the rotor assembly that realize the function of centripetal load bearing to radially retain the permanent magnets 2 in place when the rotating shaft 1 is rotating.

There is further provided a sealing sleeve 4 that is arranged between the permanent magnets 2 and the sleeve rings 3. The sealing sleeve 4 is a one-piece element and, accordingly, has a longer axial extension than the individual single sleeve rings 3. The sealing sleeve 4 may also have a longer axial extension than the plurality of the sleeve rings 3 to provide that the sleeve rings 3 are fitted over a complete axial extension over the sealing sleeve 4.

The sealing sleeve 4 has a front end 41 and a rear end 42. Both the front end 41 and the rear end 42 are sealed. For example, the front end 41 is sealed against the front axial stop 51, and the rear end 42 is sealed against the rear axial stop 52. By sealing the sealing sleeve 4 at the front end 41 and the rear end 42, a hermetically sealed environment or compartment is formed in which the permanent magnets 3 are arranged.

In this respect, depending on how the axial stops 51, 52 are attached to the rotating shaft 1, the sealing sleeve 4 may be provided for an additional sealing 6 at the interface between the rotating shaft 1 and the axial stops 51, 52.

The sealing sleeve 4 may be press-fit or shrink fit to the permanent magnets 2. Further, the sleeve rings 3 may be press-fit or shrink fit to the sealing sleeve 4. The outer surface of the sealing sleeve 4 may be machined or ground prior to or after assembly to the permanent magnets 2 in order to reduce the surface roughness of the sealing sleeve 4, thereby providing for a smooth assembly surface for the sleeve rings 3.

The sealing sleeve 4 has a thickness that is smaller than the thickness of the sleeve rings 3. Generally, the sealing sleeve 4 may be thin compared to the sleeve rings 3, similar to a liner. In embodiments, the sealing sleeve 4 has a thickness less than 50 percent or less than 10 percent of the thickness of the sleeve rings 3.

The sealing sleeve 4 may be made of a non-corrosive or low-corrosive material with low or non-ferromagnetic properties. The permeability may be in the range between 1 and 10. Embodiments include that the sealing sleeve 4 is made of a carbon-fiber-reinforced polymer or of stainless steel. The sealing sleeve 4 may be made of the same material as the rotating shaft 1 and/or the axial stops 51, 52.

The sleeve rings 3 may be formed by metallic bands. In other embodiments, the sleeve rings 3 may be formed by a composite material such as carbon-fiber-reinforced polymer. In an embodiment, both the sleeve rings 3 and the sealing sleeve 4 are formed by a carbon-fiber-reinforced polymer.

In another embodiment, the sleeve rings 3 are formed by a carbon-fiber-reinforced polymer, where the sealing sleeve 4 is a stainless steel sleeve that has been heat shrunk on the outside of the permanent magnets 2. In such case, the ends 41, 42 of the sealing sleeve 4 may be welded to the axial stops 51, 52 for sealing.

The permanent magnets may be formed by a plurality of magnetic materials. In an embodiment, the permanent magnets are neodymium iron boron magnets. Such magnets are particularly prone to corrosion. By providing the sealing sleeve 4 sealed at both ends 41, 42 and, thereby, providing a sealed environment, neodymium iron boron magnets may be used as permanent magnets without concern for corrosion. Alternatively, for example, samarium-cobalt magnets may be used as permanent magnets 2.

Figure 2:
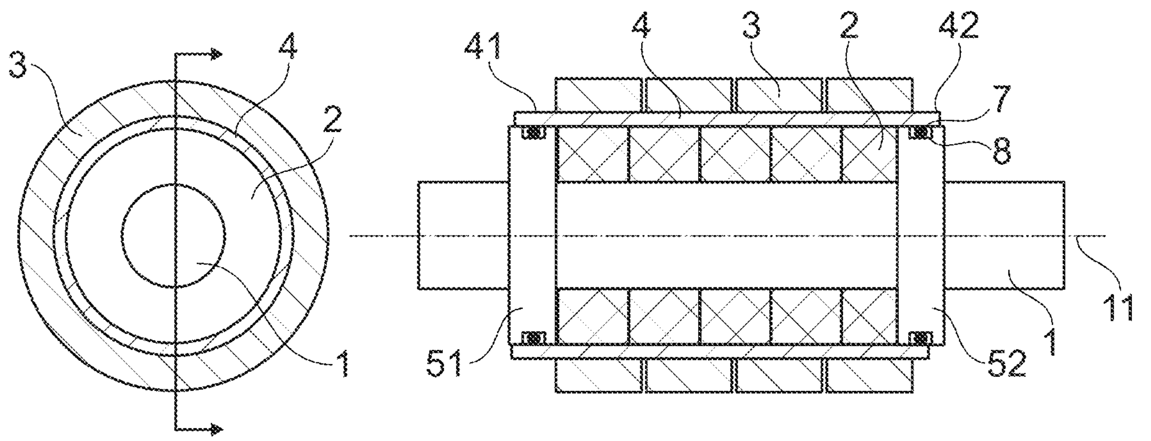
FIG. 2 is a schematic depiction of a further embodiment of a rotor assembly.

FIG. 2 shows an embodiment of a rotor assembly that has the same general construction as the rotor assembly of FIG. 1. Accordingly, reference is made to the description of FIG. 1 regarding the rotating shaft 1, the permanent magnets 2, the sleeve rings 3, and the sealing sleeve 4.

The embodiment of FIG. 2 differs from the embodiment of FIG. 1 in that a particular kind of sealing of the front end 41 and of the rear end 42 of the sealing sleeve 4 is depicted. More particularly, the ends 41, 42 of the sealing sleeve 4 are each sealed by an O-ring 7 against the front axial stop 51 and the rear axial stop 52. A recess 8 is formed in the radially outer face of the axial stop 51, 52, where the O-ring 7 is arranged in the recess 8. Other gaskets than an O-ring 7 may be implemented instead.

Figure 3:
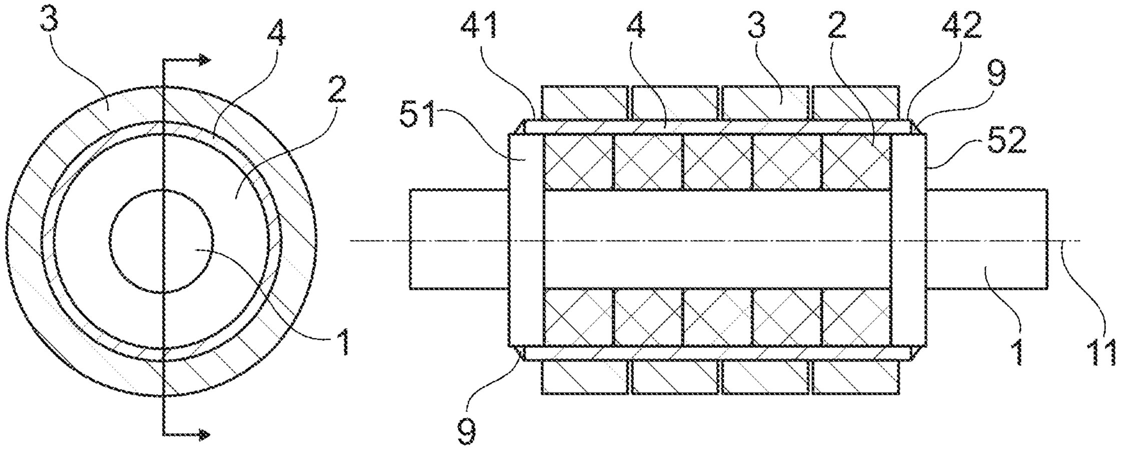
FIG. 3 is a schematic depiction of a further embodiment of a rotor assembly.

FIG. 3 shows a further embodiment of a rotor assembly that has the same general construction as the rotor assembly of FIG. 1. Accordingly, reference is made to the description of FIG. 1 regarding the rotating shaft 1, the permanent magnets 2, the sleeve rings 3, and the sealing sleeve 4.

The embodiment of FIG. 3 differs from the embodiment of FIG. 1 in that a particular kind of sealing of the front end 41 and of the rear end 42 of the sealing sleeve 4 is depicted. More particularly, the front end 41 and the rear 42 are each sealed by welding, brazing, soldering, or an adhesive joint to the respective axial stop 51, 52. A corresponding welding structure, brazing structure, soldering structure, or adhesive joint is schematically indicated by reference numeral 9.

The kind of sealing that is implemented depends on the materials involved. For example, if the sealing sleeve 4 is made of stainless steel and the axial stops 51, 52 are made of iron or stainless steel, forming the seal by welding, brazing, or soldering may be provided. In case of carbon-fiber-reinforced polymer as material for the sealing sleeve 4, adhesive bonding may be provided for sealing. Generally, for joints/seals between one or two non-metallic materials, adhesive bonding may be provided for sealing.

Figure 4:
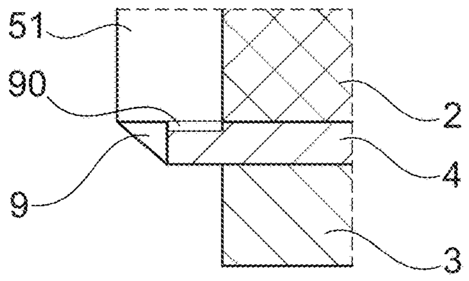
FIG. 4 is a detail of a variant of the embodiment of FIG. 3.

FIG. 4 shows a variant of the embodiment of FIG. 3, where an adhesive joint 90 is realized directly between the sealing sleeve 4 and the axial stop 51 (and in a similar manner, between sealing sleeve 4 and axial stop 52). The adhesive joint 90 is located at the radially inner face of the sealing sleeve 4 and contacts the outer circumference of stop 51. Such adhesive joint 90 may be in addition to adhesive joint 9 or be realized alternatively to adhesive joint 9.

Figure 5:
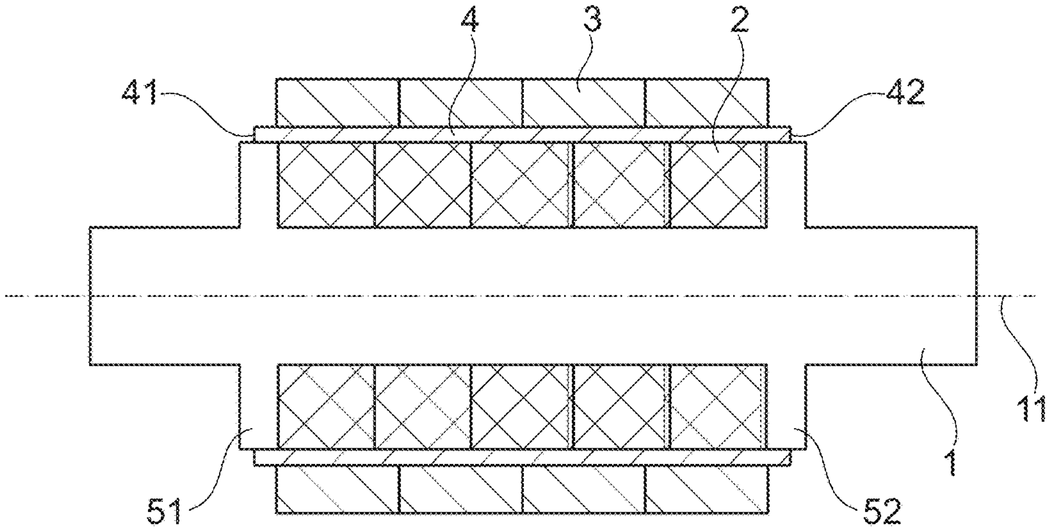
FIG. 5 is a variant of the embodiment of FIG. 1.

FIG. 5 illustrates that the axial stops 51, 52 may be implemented as one part with the rotating shaft 1. For example, axial stops 51, 52 are made from the same solid as the rest of rotating shaft 1. Apart from this difference, the embodiment of FIG. 5 is the same as the embodiment of FIG. 1.

Figure 6:
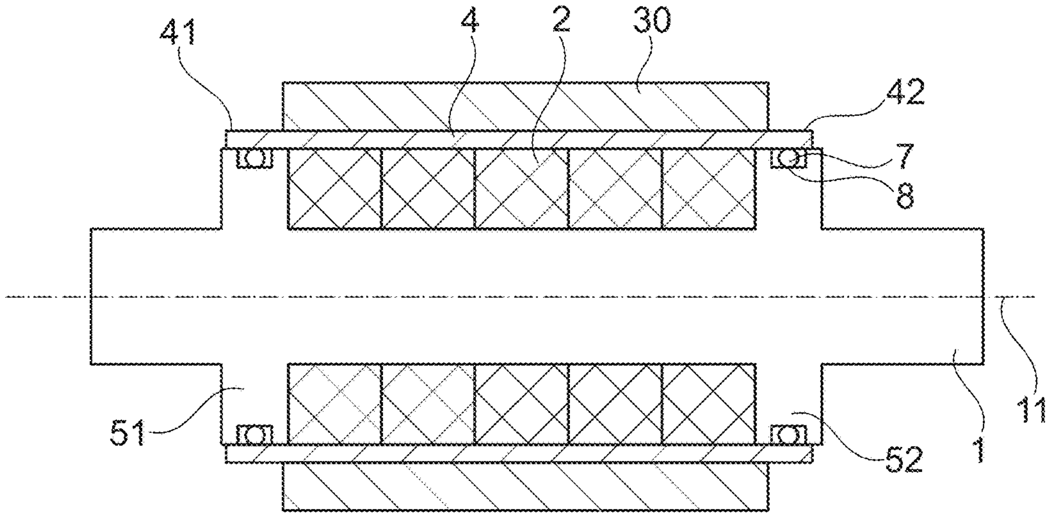
FIG. 6 is a variant of the embodiment of FIG. 2.

In the embodiment of FIG. 6, a single sleeve ring 30 is provided for instead of a plurality of sleeve rings 3 as implemented in the embodiment of FIG. 2, to which this embodiment otherwise corresponds. The single sleeve ring 30 radially retains the permanent magnets 2. The function of the single sleeve ring 30 and its interaction with sealing sleeve 4 is the same as in the embodiment of FIGS. 1 to 3. The single sleeve ring 30 may be formed by a metallic band or a composite material such as a carbon-fiber-reinforced polymer.

The embodiment of FIG. 6 illustrates that the provision of a sealing sleeve 4 does not depend on the number of sleeve rings used to radially retain the permanent magnets.

Figure 7:
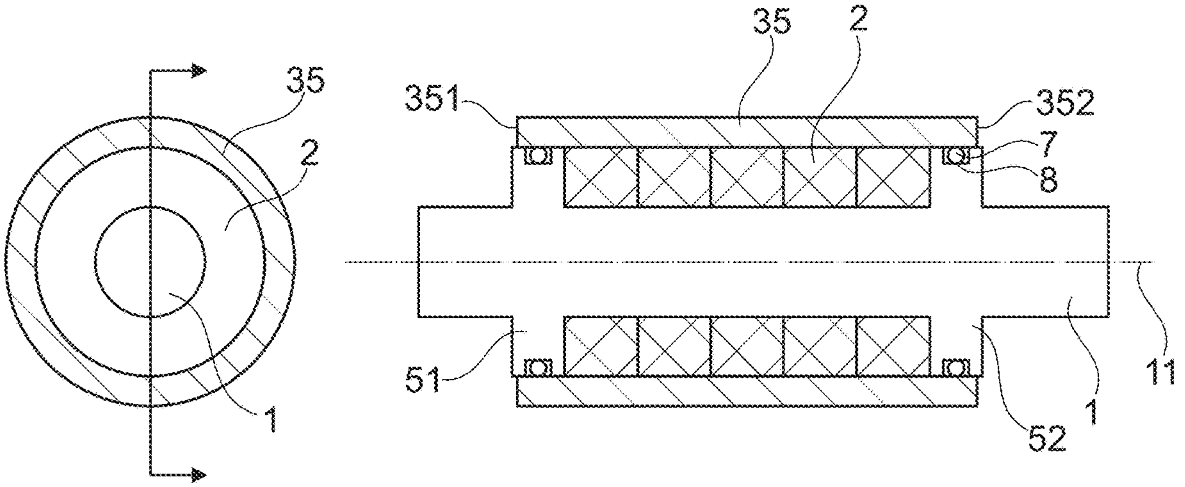
FIG. 7 is a schematic depiction of an embodiment of a rotor assembly.

An alternative embodiment of is illustrated in FIG. 7. This embodiment differs from the previously described embodiments in that a sealing sleeve is not implemented. Instead, a one-piece sleeve ring 35 serves to also hermetically seal the permanent magnets 2.

More particularly, the rotor assembly includes a rotating shaft 1 that has a rotation axis 11 about which the rotating shaft 1 rotates and which defines an axial direction of the rotor assembly. The rotor assembly further includes permanent magnets 2 that are attached to the rotating shaft 1 (e.g., either directly as shown or through a magnet core located between the rotating shaft 1 and the permanent magnets 2 (not shown)). The permanent magnets 2 may be segmented in the axial direction, as shown in FIG. 7. For example, the permanent magnets 2 may be formed by a plurality of disk-shaped, segmented magnets that are arranged on the outer surface of the rotating shaft 1 one behind the other in the axial direction.

The permanent magnets 2 may be glued or otherwise connected to the rotating shaft 1. The sequence of magnetic polarity of the permanent magnets 2 in the circumferential direction is provided in a manner known to the skilled person. For example, the permanent magnets are arranged in a Halbach configuration.

Also attached to the rotating shaft 1 are two axial stops in the form of discs 51, 52. The permanent magnets 2 extend in the axial direction between the front axial stop 51 and the rear axial stop 52. The axial stops 51, 52 are axial stops for the permanent magnets 2 and prevent the permanent magnets 2 from becoming free or loose in the axial direction.

The rotating shaft 1 consists, for example, of iron or stainless steel or a non-conductive material. The rotating shaft 1 may be formed in one piece. The axial stops 51, 52 may consist of the same material as the rotating shaft 1. The axial stops 51, 52 may be separate elements or be formed in one piece with the rotating shaft 1, as shown in FIG. 7.

The rotor assembly further includes a one-piece sleeve ring 35 that is configured and serves to radially retain the permanent magnets 2. The sleeve ring 35 includes a front end 351 and a rear end 352. The sleeve ring 35 is sealed at the front end 351 to the front axial stop 51 and at the rear end 355 to the rear axial stop 52, thereby providing for a hermetically sealed enclosure in which the permanent magnets 2 are located. Accordingly, the one-piece sleeve ring 35 realizes both the function of load carrying and the function of sealing the permanent magnets 2.

The one-piece sleeve ring 35 may be formed by a metallic band or a composite material such as a carbon-fiber-reinforced polymer.

In the embodiment of FIG. 7, to achieve a sealing, the one-piece sleeve ring 35 is sealed by a gasket at the ends 351, 352 to the front axial stop 51 and rear axial stop 52, respectively. More particularly, the ends 351, 352 of the one-piece sleeve ring 35 are each sealed by an O-ring 7 against the front axial stop 51 and the rear axial stop 52. To this end, a recess 8 is formed in the radially outer face of the axial stop 51, 52, where the O-ring 7 is arranged in the recess 8. Other gaskets than an O-ring 7 may be implemented instead.

Figure 8:
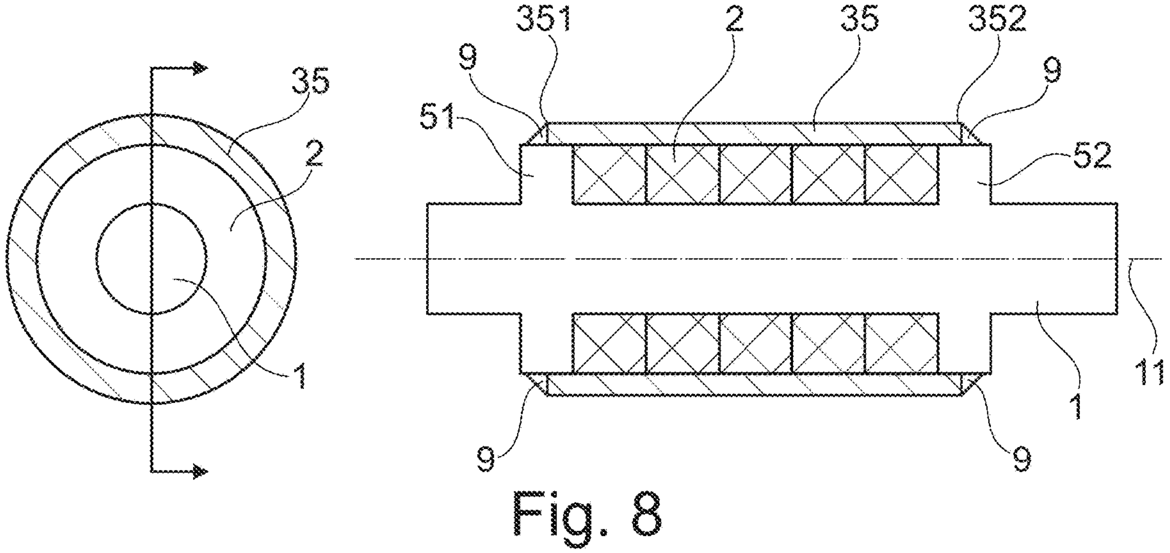
FIG. 8 is a schematic depiction of a further embodiment of a rotor assembly.

FIG. 8 shows a further embodiment of a rotor assembly that has the same general construction as the rotor assembly of FIG. 7. Accordingly, reference is made to the description of FIG. 7 regarding the rotating shaft 1, the permanent magnets 2, and the one-piece sleeve rings 35.

The embodiment of FIG. 8 differs from the embodiment of FIG. 7 in that a different kind of sealing of the front end 351 and of the rear end 351 of the one-piece sleeve ring 35 is provided for. In FIG. 8, to achieve a sealing, the one-piece sleeve ring 35 is welded, brazed, or soldiered at the ends 351, 352 to the front axial stop 51 and rear axial stop 52, respectively. A corresponding welding structure, brazing structure, soldering structure, or adhesive joint is schematically indicated by reference numeral 9.

The kind of sealing that is implemented depends on the materials involved. For example, if the one-piece sleeve ring 35 is made of stainless steel and the axial stops 51, 52 are made of iron or stainless steel, forming the seal by welding, brazing, or soldering may be a provided method. In case of carbon-fiber-reinforced polymer as material for the one-piece sleeve ring 35, adhesive bonding may be a provided way of sealing. Generally, for joints/seals between one or two non-metallic materials, adhesive bonding may be a provided way of sealing.

Figure 9:
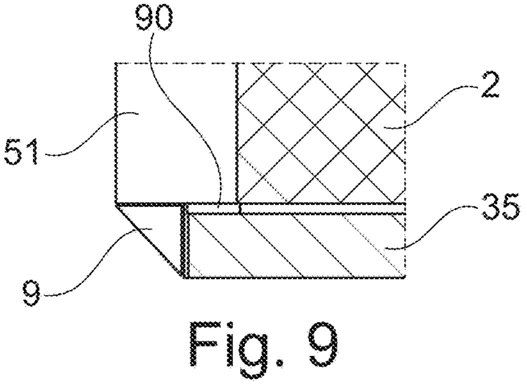
FIG. 9 is a detail of a variant of the embodiment of FIG. 8.

FIG. 9 shows a variant of the embodiment of FIG. 8, where an adhesive joint 90 is realized directly between the one-piece sleeve ring 35 and the axial stop 51 (and in a similar manner, between the one-piece sleeve ring 35 and axial stop 52). The adhesive joint 90 is located at the radially inner face of the sleeve ring 35 and contacts the outer circumference of stop 51. Such adhesive joint 90 may be in addition to adhesive joint 9 or be realized alternatively to adhesive joint 9.

It should be understood that the above description is intended for illustrative purposes only and is not intended to limit the scope of the present disclosure in any way. Also, those skilled in the art will appreciate that other aspects of the disclosure may be obtained from a study of the drawings, the disclosure, and the appended claims. All methods described herein may be performed in any suitable order unless otherwise indicated herein or otherwise clearly contradicted by context. Various features of the various embodiments disclosed herein may be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotor assembly comprising:
- a rotating shaft having a rotation axis that defines an axial direction;
- permanent magnets attached to the rotating shaft;
- at least one sleeve ring configured to radially retain the permanent magnets;
- a sealing sleeve arranged between the permanent magnets and the at least one sleeve ring, wherein the sealing sleeve comprises a front end and a rear end, and is sealed both at the front end and the rear end, such that a hermetically sealed enclosure in which the permanent magnets are located is provided; and
- a front axial stop and a rear axial stop attached to or being part of the rotating shaft,
- wherein the permanent magnets are attached to the rotating shaft between the front axial stop and the rear axial stop, and
- wherein the sealing sleeve is sealed at the front end to a radially outermost surface of the front axial stop and at the rear end to a radially outermost surface of the rear axial stop.

2. The rotor assembly of claim 1, wherein the front axial stop is a front disc, and the rear axial stop is a rear disc, and
- wherein the front disc and the rear disc extend in a radial direction from the rotating shaft.

3. The rotor assembly of claim 1, wherein a connection of the front axial stop and rear axial stop to the rotating shaft is sealed.

4. The rotor assembly of claim 1, wherein the front axial stop and the rear axial stop are made of a same material as the rotating shaft.

5. The rotor assembly of claim 1, wherein the sealing sleeve is welded, brazed, or soldered at the front end and at the rear end to the front axial stop and the rear axial stop, respectively, to achieve the sealing.

6. The rotor assembly of claim 1, wherein the sealing sleeve is sealed by a first gasket at the front end and by a second gasket at the rear end to the front axial stop and the rear axial stop, respectively.

7. The rotor assembly of claim 6, wherein the first gasket and the second gasket are arranged in recesses at radially outer faces of the front axial stop and the rear axial stop, respectively.

8. The rotor assembly of claim 1, wherein the sealing sleeve is connected by an adhesive joint at the front end and the rear end to the front axial stop and the rear axial stop, respectively, such that sealing is achieved.

9. The rotor assembly of claim 1, wherein the sealing sleeve is made of a carbon-fiber-reinforced polymer.

10. The rotor assembly of claim 1, wherein the sealing sleeve is made of stainless steel.

11. The rotor assembly of claim 1, wherein the sealing sleeve is made of stainless steel,
- wherein the at least one sleeve ring is formed by a carbon-fiber-reinforced polymer, and
- wherein the sealing sleeve is heat-shrunk on an outside of the permanent magnets.

12. The rotor assembly of claim 1, wherein the permanent magnets are neodymium iron boron magnets.

13. The rotor assembly of claim 1, wherein the at least one sleeve ring is press-fit or shrink-fit to the sealing sleeve, or attached by hydraulic dilation to the sealing sleeve.

14. The rotor assembly of claim 1, wherein an outer surface of the sealing sleeve has been machined or ground for reducing surface roughness, improving interference fit tolerance, or a combination thereof.

15. The rotor assembly of claim 1, wherein the sealing sleeve is press-fit or shrink-fit to the permanent magnets.

16. The rotor assembly of claim 1, wherein the permanent magnets are segmented in the axial direction, radial direction, tangential direction, or any combination thereof.

17. The rotor assembly of claim 1, wherein a thickness of the sealing sleeve is smaller than a thickness of the at least one sleeve ring.

18. A rotor assembly comprising:
a rotating shaft having a rotation axis that defines an axial direction;
permanent magnets attached to the rotating shaft;
a sleeve ring configured to radially retain the permanent magnets, the sleeve ring comprising a front end and a rear end, and being sealed both at a front end and at a rear end, such that a hermetically sealed enclosure in which the permanent magnets are located is provided;
a front axial stop; and
a rear axial stop attached to or part of the rotating shaft,
wherein the permanent magnets are attached to the rotating shaft between the front axial stop and the rear axial stop, and
wherein the sleeve ring is sealed at the front end to a radially outermost surface of the front axial stop and at the rear end to a radially outermost surface of the rear axial stop.

19. The rotor assembly of claim 18, wherein the sleeve ring is welded, brazed, or soldered at the front end and at the rear end to the front axial stop and the rear axial stop, respectively, such that the sealing is achieved.

20. The rotor assembly of claim 18, wherein the sleeve ring is sealed by a first gasket at the front end and by a second gasket at the rear end to the front axial stop and the rear axial stop, respectively.

21. The rotor assembly of claim 18, wherein the sleeve ring is connected by an adhesive joint at the front end and the rear end to the front axial stop and the rear axial stop, respectively.

22. A rotor assembly comprising:
a rotating shaft having a rotation axis that defines an axial direction;
permanent magnets attached to the rotating shaft;
at least one sleeve ring configured to radially retain the permanent magnets;
a sealing sleeve arranged between the permanent magnets and the at least one sleeve ring, wherein the sealing sleeve comprises a front end and a rear end, and is sealed both at the front end and the rear end, such that a hermetically sealed enclosure in which the permanent magnets are located is provided;
a front axial stop and a rear axial stop attached to or being part of the rotating shaft,
wherein the permanent magnets are attached to the rotating shaft between the front axial stop and the rear axial stop, and
wherein the sealing sleeve is sealed at the front end to the front axial stop and at the rear end to the rear axial stop,
wherein the sealing sleeve is sealed by a first gasket at the front end and by a second gasket at the rear end to the front axial stop and the rear axial stop, respectively, and
wherein the first gasket and the second gasket are arranged in recesses at radially outer faces of the front axial stop and the rear axial stop, respectively.

* * * * *